M. MAGER.
ANTISKID CHAIN.
APPLICATION FILED MAY 22, 1919.

1,346,226.

Patented July 13, 1920.

Inventor
Mager

UNITED STATES PATENT OFFICE.

MATH MAGER, OF GARFIELD, MINNESOTA.

ANTISKID-CHAIN.

1,346,226.  Specification of Letters Patent.  Patented July 13, 1920.

Application filed May 22, 1919. Serial No. 298,902.

*To all whom it may concern:*

Be it known that I, MATH MAGER, a citizen of the United States, residing at Garfield, in the county of Douglas and State of Minnesota, have invented certain new and useful Improvements in Antiskid-Chains, of which the following is a specification.

This invention relates to anti-skid chains and more particularly to an improved method of retaining the cross members in position on the tire of the automobile wheel.

One of the objects of the invention is to provide an improved type of cross chain designed to effect a more efficient anti-skid member to take the place of the common link chains now generally employed for cross chains.

Another object of the invention is to provide a plurality of cross members having their ends connected to shrinkable retaining members which will not only hold the chains in properly spaced relation on the tire but will, when they become wet, act to draw the chains taut so that they will not slip on the tire.

The invention further aims to provide a plurality of cross members held in position by a pair of annular shrinkable members each of a length less than the circumference of the rim of the wheel so that the shrinkable retaining members will be held in position considerably spaced away from the rim whereby frictional contact with any part of the wheel will be prevented to facilitate tightening when the shrinkable members become wet.

A further object of the invention is the provision of a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 3:
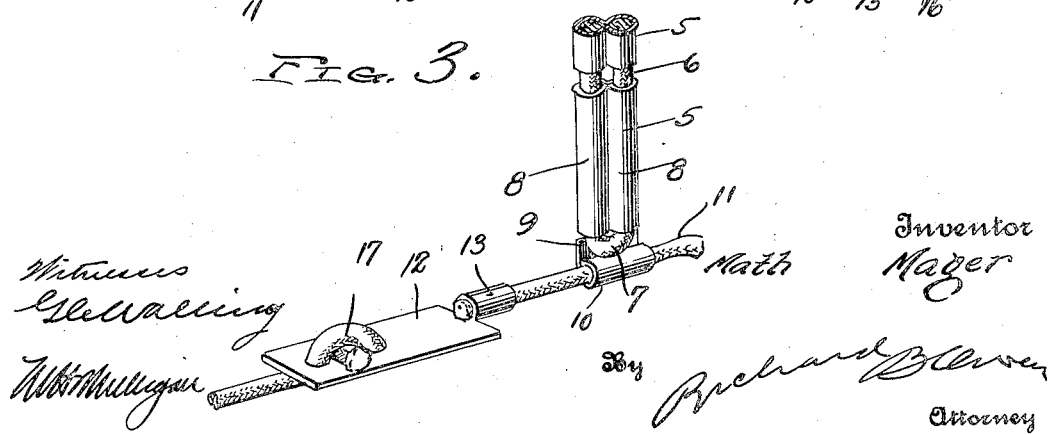
Fig. 3 is a perspective view of the coupling member, and a portion of one of the cross members connected to one of the shrinkable retaining members.

Referring to the drawings wherein is illustrated the preferred form of my invention, in which like characters of reference indicate like or corresponding parts throughout the several views, the automobile wheel is provided with the usual tire 1 supported on the rim 2, the rim being mounted on the spokes 3 in the usual manner. A plurality of cross members 4 extend across the tread of the tire and these cross members are constructed of a plurality of metallic members 5 mounted on flexible cords 6 preferably constructed of fibrous material such as the well known sash cord. A length of sash cord is folded upon itself intermediate its ends so that the two strands of sash cord are in parallel relation folded as indicated at 7. The metallic members 5 are constructed of substantially rectangular plates bent to form parallel sleeves 8, each sleeve embracing one of the strands of the cord in each cross member. The adjacent ends of the sleeves are spaced apart so that the cross members may be readily flexed to extend around the tread of the tire and the sleeves are firmly and tightly engaged with the cord to prevent displacement of the metallic members. The endmost member 5 in each cross member is equipped with an extended portion 9 rolled to form a loop 10 and these loops receive the flexible retaining member 11. The flexible retaining member 11 is preferably constructed of the same material as the members 6 and the ordinary sash cord is found to be most advantageous for this purpose although any rope or cable constructed of shrinkable material may be employed. Sash cord, however, will shrink rapidly when wet, and consequently is best adapted for the purpose set forth. The sash cord constituting the opposite flexible retaining members 6, is passed through the sleeve 10 in the ends of each of the cross members and one end of each member 11 is secured to a coupling member indicated at 12. This coupling member comprises a substantially rectangular plate having a slit sleeve 13 at one end to receive one end of the member 11. The sleeve 13 may be open to admit the end of the cord after which it is tightly and firmly closed about the cord to retain it in position on the coupling member. The opposite end of the plate 12 is provided with three openings 14, 15 and 16. The openings 14 and 15 are in longitudinal alinement with respect to the centerline of the plate 12 while the opening 16 is at one side of the plate and is spaced equi-distant from the openings 14 and 15. The openings 14 and 15 are adapted to receive the opposite end of the sash cord 11. The cord is first passed through the opening 14 and then through the opening 15, thus forming a loop 17. The end of the cord is now passed through the opening 16 and under the loop 17. When the sash cord is drawn taut, the loop will engage the free end of the sash cord and maintain the same in position against displacement as shown to advantage in Fig. 3. Obviously a pull on the cord at this end will tend to more tightly maintain the end of the cord in position on the coupling plate and this arrangement will also permit the cord to be readily adjusted.

Figure 1:
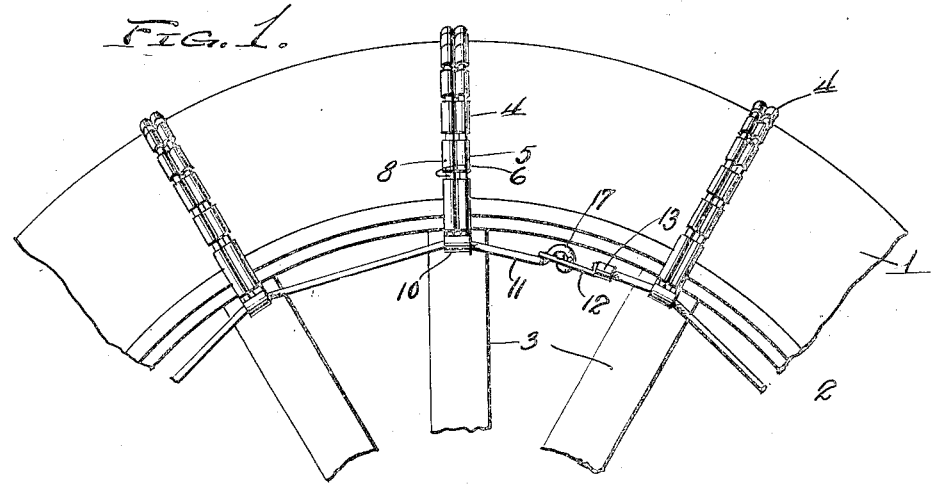
Figure 1 is a fragmentary side elevation of a portion of the device constructed in accordance with my invention, and showing its application to a tire.
Figure 2:
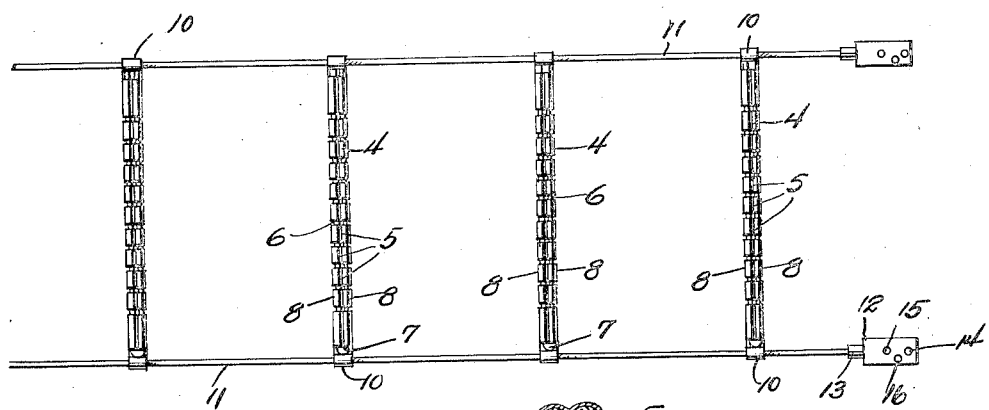
Fig. 2 is a plan view of the same.

As shown to advantage in Fig. 1, the circumference of the cords or retaining members 11 when in applied position, is less than the circumference of the rim of the wheel and the cords are spaced apart considerably away from the rim of the wheel and out of contact with the spokes 3. When the device is placed in position on the tire, the cross members will be equally spaced apart, and inasmuch as anti-skid chains are usually employed during wet weather, or at least when the surface of the roadway is wet, it will be obvious that some of the moisture will wet the shrinkable cord 6. These will immediately begin to shrink and the cross member will be drawn taut across the tread of the tire and tightly held so that slipping will be prevented and inasmuch as the cords 11 are out of contact with any part of the wheel, they will not wear by friction and therefore will be durable and efficient while in use. The cross members 4, being constructed in the manner stated, will also shrink to a considerable extent and the metal sleeves 11 will act to prevent skidding and prevent wear on the shrinkable portions of the cross members.

The foregoing description and accompanying drawing have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. An anti-skid chain device comprising a pair of flexible retaining members, anti-skid members extended between the retaining members and attached thereto, and comprising shrinkable cords folded upon themselves to provide parallel strands, and metallic sleeves arranged in pairs and fixed to the said parallel strands.

2. As an article of manufacture a clasp to be used with an anti skid chain comprising metallic sleeves adapted to be fixed to the cross members of anti skid chains and a metallic sleeve integral with said first mentioned sleeve and disposed at right angles thereto for receiving the retaining member of an anti skid chain.

In testimony whereof I affix my signature in presence of two witnesses.

MATH MAGER.

Witnesses:
 FRANK BUSCHER,
 F. A. BUSCHER.